United States Patent
Suzuki et al.

(10) Patent No.: US 10,987,899 B2
(45) Date of Patent: Apr. 27, 2021

(54) ACTIVE ENERGY RAY CURABLE RESIN COMPOSITION, LAMINATE, MANUFACTURING METHOD THEREOF, AND PRODUCT

(71) Applicant: Dexerials Corporation, Tokyo (JP)

(72) Inventors: Ryo Suzuki, Tokyo (JP); Shinobu Hara, Tokyo (JP); Mikihisa Mizuno, Tokyo (JP)

(73) Assignee: Dexerials Corporation, Tokyo (JP)

( * ) Notice: Subject to any disclaimer, the term of this patent is extended or adjusted under 35 U.S.C. 154(b) by 185 days.

(21) Appl. No.: 16/129,189

(22) Filed: Sep. 12, 2018

(65) Prior Publication Data
US 2019/0094423 A1    Mar. 28, 2019

(30) Foreign Application Priority Data
Sep. 22, 2017 (JP) .............................. JP2017-182186

(51) Int. Cl.
| | | |
|---|---|---|
| *B32B 3/10* | (2006.01) | |
| *B32B 7/12* | (2006.01) | |
| *B32B 9/00* | (2006.01) | |
| *B32B 27/06* | (2006.01) | |
| *B32B 9/04* | (2006.01) | |
| *B32B 17/06* | (2006.01) | |

(52) U.S. Cl.
CPC .............. *B32B 7/12* (2013.01); *B32B 9/002* (2013.01); *B32B 9/04* (2013.01); *B32B 27/06* (2013.01); *B32B 17/06* (2013.01); *Y10T 428/24802* (2015.01)

(58) Field of Classification Search
None
See application file for complete search history.

(56) References Cited

U.S. PATENT DOCUMENTS

2018/0050513 A1* 2/2018 Mizuno ................. B32B 27/285

FOREIGN PATENT DOCUMENTS

| JP | 2004-174316 | 6/2004 | |
|---|---|---|---|
| JP | 2005-056503 | 3/2005 | |
| JP | 3760669 | 1/2006 | |
| JP | 2017-081148 | 5/2017 | |
| WO | WO-2016143522 A1 * | 9/2016 | ............... B32B 7/12 |
| WO | 2017073262 | 5/2017 | |

OTHER PUBLICATIONS

Japan Patent Office, Japanese First Office Action issued in corresponding Japanese Application No. 2017-182186, dated Jan. 23, 2018.

* cited by examiner

*Primary Examiner* — Christopher M Polley
(74) *Attorney, Agent, or Firm* — Carmody Torrance Sandak & Hennessey LLP (57) ABSTRACT

Provided is a laminate including a substrate, a primer layer disposed on the substrate, and a functional layer disposed on the primer layer, where the functional layer has a function of at least one of an anti-fogging property and an anti-fouling property, wherein a surface of an edge portion of the laminate at the side of the functional layer has a projected portion having an apex formed along an edge side of the edge portion, and on a cross-section orthogonal to a direction of the edge side and a planar direction of the surface, a height of the projected portion is 10 μm or less, a width of the projected portion is 15 mm or less, and a length between the edge side and the apex is 5.0 mm or less.

18 Claims, 2 Drawing Sheets

ACTIVE ENERGY RAY CURABLE RESIN COMPOSITION, LAMINATE, MANUFACTURING METHOD THEREOF, AND PRODUCT

BACKGROUND OF THE INVENTION

Field of the Invention

The present invention relates to a laminate, a manufacturing method of the laminate, a product using the laminate, and an active energy ray curable resin composition. The laminate can be used in a wide variety of fields (building use, industrial use, automobile use, optical use, solar battery panels, etc.) and the laminate has at least one of an anti-fogging property and an anti-fouling property. The active energy ray curable resin composition can be applicable for formation of a primer layer of the laminate.

Description of the Related Art

To decorate and protect surfaces of products, resin films, glass, etc. are attached to the surfaces.

However, the resin films and glass decorating and protecting the surfaces of products sometimes get fogged to reduce visibility and good appearance of the products.

To prevent reduction of visibility and good appearance of products, an anti-fogging treatment or an anti-fouling treatment is applied to the resin films and glass.

For example, proposed is an electron ray curable hard coat sheet having an anti-fogging property and an anti-fouling property, and having a certain composition (see, for example, Japanese Patent No. 3760669).

For example, moreover, proposed is an anti-fog laminate having an anti-fog layer (see, for example, Japanese Patent Application Laid-Open (JP-A) No. 2017-81148).

A method for manufacturing any of these laminates is typically a method where a resin composition having an anti-fogging property or an anti-fouling property is applied onto a substrate and then the resin composition is cured to form a functional layer having an anti-fogging property or an anti-fouling property, to thereby obtain a laminate. In the formation of the laminate, a primer layer may be formed between the substrate and the functional layer to improve adhesion between the substrate and the functional layer. In this case, there are problems that a transmission image or reflection image of the laminate is distorted on an edge portion of the laminate to degrade visibility of the image.

SUMMARY OF THE INVENTION

The present invention aims to solve the above-described various problems existing in the art and to achieve the following object. Namely, the present invention has an object to provide a laminate having excellent visibility on an edge portion thereof, where the laminate includes a primer layer and has at least one of an anti-fogging property and an anti-fouling property, a manufacturing method of the laminate, a product using the laminate, and an active energy ray curable resin applicable for formation of the primer layer of the laminate.

Means for solving the above-mentioned problems are as follows.

<1> A laminate including:
  a substrate;
  a primer layer disposed on the substrate; and
  a functional layer disposed on the primer layer, where the functional layer has a function of at least one of an anti-fogging property and an anti-fouling property, wherein a surface of an edge portion of the laminate at the side of the functional layer has a projected portion having an apex formed along an edge side of the edge portion, and
on a cross-section orthogonal to a direction of the edge side and a planar direction of the surface, a height of the projected portion is 10 μm or less, a width of the projected portion is 15 mm or less, and a length between the edge side and the apex is 5.0 mm or less.
<2> The laminate according to <1>,
wherein a height of the projected portion is from 1 μm to 10 μm.
<3> The laminate according to <1> or <2>,
wherein a surface of the functional layer has a pure water contact angle of 80° or more and a hexadecane contact angle of 35° or more.
<4> The laminate according to any one of <1> to <3>,
wherein the primer layer has an average thickness of from 0.5 μm to 5 μm.
<5> The laminate according to any one of <1> to <4>,
wherein the functional layer has an average thickness of 10 μm or more.
<6> The laminate according to any one of <1> to <5>,
wherein the functional layer has a coefficient of dynamic friction of 0.40 or less.
<7> The laminate according to any one of <1> to <6>,
wherein the primer layer is a cured product of an active energy ray curable resin composition, and
the active energy ray curable resin composition includes a surfactant.
<8> The laminate according to <7>,
wherein the surfactant is at least one of a silicone-based surfactant and a fluorine-based surfactant.
<9> The laminate according to <7> or <8>,
wherein an amount of the surfactant in the active energy ray curable resin composition is from 0.0001% by mass to 5.0% by mass relative to a non-volatile component of the active energy ray curable resin composition.
<10> A product including:
  the laminate according to any one of <1> to <9> on a surface of the product.
<11> The product according to <10>,
wherein the product is a mirror.
<12> The product according to <11>,
wherein the product is at least one of a mirror for bathrooms, and a mirror for washstands.
<13> The product according to <11> or <12>,
wherein an image of a wire mesh appeared in the mirror is not distorted when the wire mesh having an opening size of 1 cm is placed at a position that is 1 m away from a surface of the mirror in the normal direction relative to the surface of the mirror and the image of the wire mesh appeared in the mirror is visually evaluated.
<14> An active energy ray curable resin composition including:
  a surfactant,
wherein the active energy ray curable resin composition is used for forming the primer layer of the laminate according to any one of <1> to <6>.
<15> The active energy ray curable resin composition according to <14>,
wherein the surfactant is at least one of a silicone-based surfactant and a fluorine-based surfactant.
<16> The active energy ray curable resin composition according to <14> or <15>,
wherein an amount of the surfactant in the active energy ray curable resin composition is from 0.0001% by mass to 5.0% by mass relative to a non-volatile component of the active energy ray curable resin composition.

<17> A method for manufacturing the laminate according to any one of <1> to <6>, the method including:

applying an active energy ray curable resin composition including a surfactant onto the substrate and curing the active energy ray curable resin composition to form the primer layer.

<18> The method according to <17>,
wherein the surfactant is at least one of a silicone-based surfactant and a fluorine-based surfactant.

<19> The method according to <17> or <18>,
wherein an amount of the surfactant in the active energy ray curable resin composition is from 0.0001% by mass to 5.0% by mass relative to a non-volatile component of the active energy ray curable resin composition.

The present invention can solve the above-described various problems existing in the art, achieve the above-mentioned object, and can provide a laminate having excellent visibility on an edge portion thereof, where the laminate includes a primer layer and has at least one of an anti-fogging property and an anti-fouling property, a manufacturing method of the laminate, a product using the laminate, and an active energy ray curable resin applicable for formation of the primer layer of the laminate.

DESCRIPTION OF THE EMBODIMENTS (Laminate)

A laminate of the present invention includes at least a substrate, a primer layer, and a functional layer. The laminate may further include other members according to the necessity.

In the case where a functional layer having a function, such as an anti-fogging property and an anti-fouling property, is formed on a surface of a substrate by a coating method, an image is distorted on an edge portion of a laminate to degrade visibility. A reduction in visibility becomes more significant, as an average thickness of the functional layer is thicker (for example, an average thickness is 10 μm or more).

The present inventors diligently conducted researches to solve the above-mentioned problem. Then, the present inventors confirmed that a cause for degrading visibility was a projected portion formed on an edge portion. Moreover, the present inventors confirmed that, when the functional layer was formed by a coating method, a coating material applied onto an edge portion of the substrate was risen due to a surface tension to form a projected portion on the edge portion.

Then, the present inventors diligently conducted further researches and found that formation of a projected portion on an edge portion could be suppressed by adding a surfactant to a composition used for forming a primer layer. As a result, the present invention was accomplished.

<Characteristics of Laminate>

The laminate has the following characteristics.
The laminates includes the primer layer and the functional layer.

A surface of an edge portion of the laminate at the side of the functional layer has a projected portion having an apex formed along an edge side of the edge portion.

On a cross-section orthogonal to a direction of the edge side and a planar direction of the surface, a height of the projected portion is 10 μm or less, a width of the projected portion is 15 mm or less, and a length between the edge side and the apex is 5.0 mm or less.

In the present specification, the term "edge portion" means a region including an edge side and an area near the edge side as well as including the edge side itself.

In the present specification, each length of the cross-section can be determined, for example, by measuring a cross-section profile of the laminate.

Figure 1:
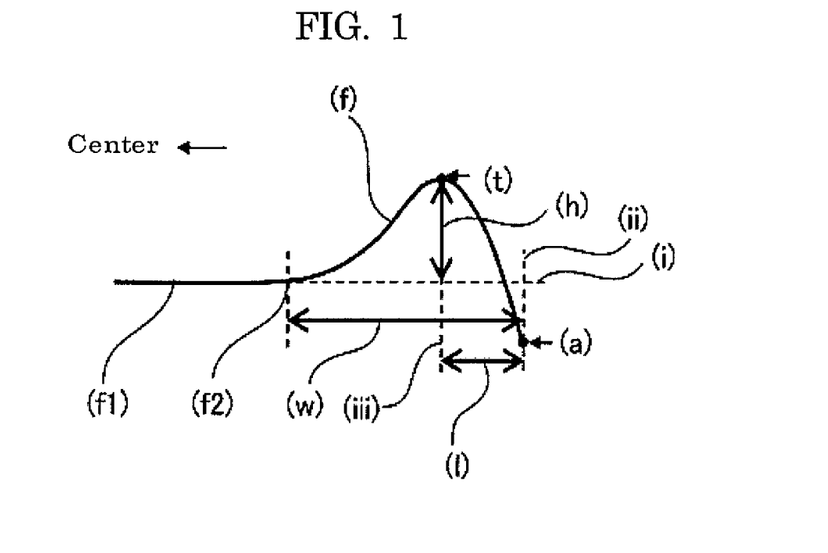
FIG. 1 is a schematic view illustrating one example of a cross-section profile of a laminate.

One example of a cross-section profile is illustrated in FIG. 1.

FIG. 1 is a schematic view illustrating one example of the cross-section profile.

FIG. 1 is a schematic view illustrating a profile of a cross-section orthogonal to a direction of an edge side of the laminate and to a planar direction of a surface of the laminate at the side of the functional layer. The solid line (f) having a projected portion depicts a surface of the functional layer. The referential sign (t) depicts a top of a peak (apex), the referential sign (a) depicts an edge side, the referential sign (h) depicts a height of the peak, the referential sign (w) depicts a width of the peak, and the referential sign (l) depicts a horizontal distance between the edge side (a) and the top (t) of the peak (a length between the edge side and the apex).

The height (h) of the peak is a distance from the apex (t) to an extended line (i) of the horizontal surface (f1) of the surface of the laminate at the side of the functional layer.

The width (w) of the projected portion is a distance from a bottom edge (f2) of the projected portion at the center side of the surface to a line (ii) orthogonal to the surface of the laminate at the side of functional layer.

The horizontal distance (l) is a distance between the line (ii) and a vertical line drawn on the extended line (i) from the apex (t).

In the present invention, it is not a necessarily a case that the smaller the height of the projected portion of the edge portion is better. In addition, it is important that a width of the projected portion is short. Specifically, visibility is poor with a projected portion having a large width even with a low height, specifically a wide projected portion with low slopes. Moreover, a position of a top of a projected portion is important. Visibility is poor when the top is too far from the edge side even when a height and width of a projected portion are small.

Therefore, the conditions for achieving good visibility includes all of the following (1) to (3).

(1) A height of the projected portion [height (h) of the peak] is 10 μm or less.
(2) A width (w) of the projected portion is 15 mm or less.
(3) A length between the edge side and the apex [horizontal distance (l)] is 5.0 mm or less.

When the height of the projected portion is more than 10 μm, distortion of an image is significantly visually recognized due to refraction. Therefore, deterioration of visibility cannot be prevented unless the height of the projected portion satisfies (1) above, even though the width of the projected portion and the length between the edge side and the apex satisfy (2) and (3), respectively.

The length between the edge side and the apex is correlated with a width of distortion of an image visually observed (=length from the edge side to an area where distortion of the image disappears towards a center direction). When the height of the projected portion satisfies (1) above, a degree of refraction is not so great and distortion of an image is not so significant. When the length between the edge side and the apex is more than 5.0 mm, however, it is visually observed as a distorted region.

When the width of the projected portion is more than 15 mm, the width of distortion of the image visually observed (=length from the edge side to an area where distortion of the image disappears towards a center direction) becomes large. Therefore, the image that does not have so significant distortion with not a great degree of refraction may be visually recognized as a distorted region when the width of the projected portion does not satisfy (2) above, even though the height of the projected portion and the length between the edge side and the apex satisfy (1) and (3) above, respectively.

<<Height of Projected Portion>>

The height of the projected portion is 10 μm or less, preferably 8.0 μm or less, more preferably 7.0 μm or less, and particularly preferably 6.5 mm or less. The lower limit of the height of the projected portion is not particularly limited and may be appropriately selected depending on the intended purpose. For example, the height of the projected portion may be 1.0 μm or more, 2.0 μm or more, or 4.0 μm or more.

<<Width of Projected Portion>>

The width of the projected portion is 15 mm or less, preferably 14 mm or less, more preferably 10 mm or less, and particularly preferably 6.0 mm or less. The lower limit of the width of the projected portion is not particularly limited and may be appropriately selected depending on the intended purpose. For example, the width of the projected portion may be 1.0 mm or more, 3.0 mm or more, or 5.0 mm or more.

<<Length Between Edge Side and Apex>>

The length (length between the edge side and the apex) is 5.0 mm or less, preferably 4.5 mm or less, more preferably 3.5 mm or less, and particularly preferably 3.0 mm. The lower limit of the length is not particularly limited and may be appropriately selected depending on the intended purpose. For example, the length may be 0.5 mm or more, 1.0 mm or more, or 2.0 mm or more.

As the conditions for achieving excellent visibility on the edge portion, specifically, the height of the projected portion is particularly preferably 5.5 mm or less, the width of the projected portion is particularly preferably 6.0 mm or less, and the length (length between the edge side and the apex) is particularly preferably 3.0 mm or less.

A cross-section profile of the laminate can be measured, for example, by the following method.

A cross-section profile of a surface of the edge portion is measured by means of Stylus Surface Profilometer P-15 available from KLA-Tencor under the following conditions.

[Measuring Conditions]
  X scan size=10 mm to 100 mm
  Scan Speed=200 μm/sec
  Sampling Rate=200 Hz
  Multi-Scan Average=1
  Applied Force=2.00 mg
  Stylus Radius=2.00 μm <Substrate>

The substrate is not particularly limited and may be appropriately selected depending on the intended purpose. Examples of the substrate include a resin substrate and an inorganic substrate.

<<Inorganic Substrate>>

Examples of the inorganic substrate include a glass substrate, a quartz substrate, and a sapphire substrate.

The glass substrate is not particularly limited and may be appropriately selected depending on the intended purpose. Examples of the glass substrate include silica glass (silicate glass), soda-lime glass, and potash glass.

Moreover, the glass substrate may be tempered glass, laminated glass, or heat-resistant glass.

The glass substrate may be used in any application, such as windowpanes for automobiles, windowpanes for buildings, lens, mirrors, and goggles.

A shape of the glass substrate is typically a plate shape, but the glass substrate may have any shape, such as a sheet shape and a curved shape.

<<Resin Substrate>>

A material of the resin substrate is not particularly limited and may be appropriately selected depending on the intended purpose. Examples of the material include triacetyl cellulose (TAC), polyester (TPEE), polyethylene terephthalate (PET), polyethylene naphthalate (PEN), polyimide (PI), polyamide (PA), aramid, polyethylene (PE), polyacrylate, polyether sulfone, polysulfone, polypropylene (PP), polystyrene, diacetyl cellulose, polyvinyl chloride, an acrylic resin (PMMA), polycarbonate (PC), an epoxy resin, a urea resin, a urethane resin, a melamine resin, a phenol resin, an acrylonitrile-butadiene-styrene copolymer, a cycloolefin polymer (COP), a cycloolefin copolymer (COC), a PC/PMMA laminate, and rubber-added PMMA.

The substrate is preferably transparent.

A form of the substrate is not particularly limited and may be appropriately selected depending on the intended purpose. The form of the substrate is preferably a film.

When the substrate is in the form of a film, an average thickness of the substrate is not particularly limited and may be appropriately selected depending on the intended purpose. The average thickness is preferably from 5 μm to 1,000 μm and more preferably from 50 μm to 500 μm.

On the surface of the substrate, letters, patterns and images, etc. may be printed.

On the surface of the substrate, a binder layer may be disposed in order to increase close adhesiveness between the substrate and a fabrication material during fabrication of the laminate, or in order to protect the letters, patterns, and images from flow resistive pressure of the fabrication material during fabrication of the laminate. As a material of the binder layer, any of various binders, such as acryl-based binders, urethane-based binders, polyester-based binders, polyamide-based binders, ethylene butyl alcohol-based binders, and ethylene-vinyl acetate copolymer-based binders, and various adhesives can be used. Note that, two or more binder layers may be disposed as the binder layer. As the binder to be used, a binder having heat-sensitivity and pressure-sensitivity suitable for a fabrication material can be selected.

A surface of the substrate opposite to the side of the functional layer may have a wrinkle pattern. Since the wrinkle pattern is disposed, blocking is prevented when a plurality of the laminates are stacked, handling in subsequent steps are improved, and products can be efficiently manufactured.

For example, the wrinkle pattern can be formed by surface texturing.

In the present specification, the term "blocking" means a phenomenon that sheets are difficult to peel away from each other when a plurality of sheets are stacked.

<Primer Layer>

The functional layer may not have sufficient adhesion to the substrate. In the laminate, therefore, a primer layer configured to improve adhesion of the functional layer to the substrate is disposed between the substrate and the functional layer.

When the primer layer is thin, an effect of improving adhesion may be insufficient. Therefore, an average thickness of the primer layer is preferably 0.5 μm or more.

Moreover, the average thickness of the primer layer is preferably from 0.5 μm to 20 μm, even more preferably from 0.5 μm to 10 μm, and particularly preferably from 0.5 μm to 5 μm.

When the average thickness of the primer layer is within the preferable range, adhesion is unlikely to be reduced even when the primer layer is exposed to high-temperature vapor (e.g., 60° C. or higher), thermal impact (e.g., a significant change from −20° C. to 80° C.), or an alkaline detergent and peeling of the functional layer can be prevented.

The average thickness can be determined by the following method.

A thickness of the primer layer can be measured by observing a cross-section of the laminate under a field emission scanning electron microscope S-4700 (product name, available from Hitachi High-Technologies Corporation). The thickness is measured at randomly selected 10 points. An average value of the measured values is determined as an average thickness. In this case, the measurement is performed at points excluding the edge portion of the laminate.

For example, the primer layer can be formed by applying an active energy ray curable resin composition. Namely, the primer layer is a cured product obtained, for example, by curing an active energy ray curable resin composition with active energy rays.

<<Active Energy Ray Curable Resin Composition>>

For example, the active energy ray curable resin composition includes a surfactant, and may further include other components, such as urethane (meth)acrylate, a photopolymerization initiator, and a solvent, according to the necessity.

Since the active energy ray curable resin composition includes the surfactant, a height of a projected portion at an edge of a primer layer to be obtained, a width of the projected portion, and a length between an edge side and an apex are kept small. As a result, a height of a projected portion at an edge portion of a functional layer to be formed on the primer layer, a width of the projected portion, and a length between an edge side and an apex can be made small.

<<<Surfactant>>>

Examples of the surfactant include silicone-based surfactants, acryl-based surfactants, cation-based surfactants, anion-based surfactants, nonion-based surfactants, amphoteric surfactants, and fluorine-based surfactants. Among the above-listed examples, a silicone-based surfactant is preferable because surface tension can be significantly reduced.

As the silicone-based surfactant, for example, modified silicone, such as polyester-modified silicone and polyether-modified silicone, can be used. Among the above-listed examples, polyether-modified silicone is preferable because surface tension can be significantly reduced.

As the polyether-modified silicone, polyether-modified polydimethylsiloxane is preferably used.

As the polyester-modified silicone, polyester-modified polydimethylsiloxane is preferably used.

Examples of commercial products of the silicone-based surfactant include BYK-347, BYK-348, BYK-UV3500, BYK-UV3510, BYK-UV3530, and BYK-UV3570 (all product names, available from BYK) and KP323 (product name, available from Shin-Etsu Chemical Co., Ltd.). Among the above-listed examples, BYK-UV3500, BYK-UV3510, and KP323 are preferable because wettability of a composition (coating material) for forming the functional layer becomes even more excellent.

Examples of the fluorine-based surfactant include a fluorine-based surfactant having a structure including a perfluoroalkyl group.

Examples of commercial products of the fluorine-based surfactant include: MAGAFACE F-470, F-471, F-472SF, F-474, F-475, R-30, F-477, F-478, F-479, BL-20, R-61, and R-90 (all product names, available from DIC Corporation); and FC-170C, FC-4430, and FC-4432 (all product names, available from Sumitomo 3M Limited).

The surfactant may or may not have a (meth)acryloyl group.

An amount of the surfactant in the active energy ray curable resin composition is not particularly limited and may be appropriately selected depending on the intended purpose. An amount of the surfactant is preferably from 0.0001% by mass to 5.0% by mass, more preferably from 0.0001% by mass to 3.0% by mass, and particularly preferably from 0.005% by mass to 1.0% by mass relative to a non-volatile component of the active energy ray curable resin composition. When the amount is within the particularly preferable range, both adhesion and reduced surface tension are achieved at a high level.

<<<Urethane (meth)acrylate>>>

The urethane (meth)acrylate is not particularly limited and may be appropriately selected depending on the intended purpose. Examples of the urethane (meth)acrylate include aliphatic urethane (meth)acrylate and aromatic urethane (meth)acrylate. Among the above-listed examples, aliphatic urethane (meth)acrylate is preferable.

An amount of the urethane (meth)acrylate in the active energy ray curable resin composition is not particularly limited and may be appropriately selected depending on the intended purpose. The amount of the urethane (meth)acrylate is preferably from 40% by mass to 80% by mass, more preferably from 50% by mass to 75% by mass, and particularly preferably from 60% by mass to 70% by mass, relative to a non-volatile component of the active energy ray curable resin composition.

<<<Photopolymerization Initiator>>>

Specific examples of the photopolymerization initiator include specific examples of the photopolymerization initiator listed in the description of the functional layer described later.

<<<Solvent>>>

Specific examples of the solvent include specific examples of the solvent listed in the description of the functional layer described layer.

The active energy ray curable resin composition preferably further includes (meth)acrylate having an alkylene oxide structure. Examples of the (meth)acrylate having an alkylene oxide structure include glycerin alkoxytri(meth) acrylate, pentaerythritol alkoxytetra(meth)acrylate, isocyanuric acid alkoxytri(meth)acrylate, bisphenol A alkoxydi (meth)acrylate, polyalkylene glycol di(meth)acrylate, and trimethylol propane alkoxytri(meth)acrylate. Examples of the alkylene oxide include ethylene oxide and propylene oxide.

An amount of the (meth)acrylate having an alkylene oxide structure in the active energy ray curable resin composition is not particularly limited and may be appropriately selected depending on the intended purpose. The amount of the (meth)acrylate having an alkylene oxide structure is preferably from 15% by mass to 50% by mass, more preferably from 20% by mass to 45% by mass, and particularly preferably from 25% by mass to 38% by mass, relative to a non-volatile component of the active energy ray curable resin composition.

A method of the coating is not particularly limited and may be appropriately selected depending on the intended purpose. Examples of the method include wire bar coating, blade coating, spin coating, reverse roll coating, die coating, spray coating, roll coating, gravure coating, microgravure coating, lip coating, air knife coating, curtain coating, comma coating, and dip coating.

The active energy ray curable resin composition is cured by radiation of active energy rays. The active energy rays are not particularly limited and may be appropriately selected depending on the intended purpose. Examples of the active energy rays include electron beams, UV rays, infrared rays, laser beams, visible rays, ionizing radiation (X rays, α rays, ß rays, γ rays, etc.), microwaves, and high-frequency waves.

<Functional Layer>

The functional layer has at least one of an anti-fogging property and an anti-fouling property.

<<Pure Water Contact Angle>>

A pure water contact angle of a surface of the functional layer is preferably 80° or more, more preferably 90° or more, and particularly preferably 100° or more. The upper limit of the pure water contact angle is not particularly limited and may be appropriately selected depending on the intended purpose. For example, the pure water contact angle may be 130° or less, 150° or less, or 170° or less.

The pure water contact angle is measured using a contact angle meter, PCA-1 (available from Kyowa Interface Science Co., Ltd.) under the following conditions. Distilled water is placed in a plastic syringe. To the tip of the syringe, a stainless steel needle is attached. The distilled water is allowed to drip on an evaluation surface (surface of the functional layer).

Amount of water to be dripped: 2 μL
Measurement temperature: 25° C.

The contact angle 5 seconds after dripping of water is measured at randomly selected 10 points on the surface of the functional layer, and the average value thereof is determined as the pure water contact angle.

<<Hexadecane Contact Angle>>

A hexadecane contact angle of a surface of the functional layer is preferably 35° or more, more preferably 40° or more, and particularly preferably 60° or more. The upper limit of the hexadecane contact angle is not particularly limited and may be appropriately selected depending on the intended purpose. For example, the hexadecane contact angle may be 100° or less, 120° or less, or 150° or less.

The hexadecane contact angle is measured using a contact angle meter, PCA-1 (available from Kyowa Interface Science Co., Ltd.) under the following conditions. Hexadecane is placed in a plastic syringe. To the tip of the syringe, a stainless steel needle is attached. The hexadecane is allowed to drip on an evaluation surface (surface of the functional layer).

Amount of hexadecane to be dripped: 1 μL
Measurement temperature: 25° C.

The contact angle 20 seconds after dripping of hexadecane is measured at randomly selected 10 points on the surface of the functional layer, and the average value thereof is determined as the hexadecane contact angle.

When the pure water contact angle falls within the above-mentioned preferable range and the hexadecane contact angle falls within the above-mentioned preferable range, it is possible to prevent stains from permeating into an underlying layer of a bulk even if aqueous stains and/or oily stains (e.g., ink of felt pens, finger prints, sweat, and cosmetics such as foundation cosmetics and UV protectors) are adhered to the surface of the functional layer. Therefore, the functional layer excels in an anti-fouling property in addition to the anti-fogging property.

<<Coefficient of Dynamic Friction>>

A coefficient of dynamic friction of the functional layer is not particularly limited and may be appropriately selected depending on the intended purpose. The coefficient of dynamic friction thereof is preferably 0.40 or less, more preferably 0.37 or less, and particularly preferably 0.30 or less. When the coefficient of dynamic friction is 0.40 or less, slidability of a wiping material is good and dirt that may be deposited is easily wiped. Moreover, an effect of releasing a force is obtained and therefore the functional layer is unlikely to be scratched.

The lower limit of the coefficient of dynamic friction of the functional layer is not particularly limited and may be appropriately selected depending on the intended purpose. For example, the coefficient of dynamic friction of the functional layer is preferably 0.10 or more.

The coefficient of dynamic friction is determined by the following method.

The coefficient of dynamic friction is measured using Triboster TS501 (product name, available from Kyowa Interface Science Co., Ltd.). BEMCOT (registered trademark) M-3II (product name, available from by Asahi Kasei Corporation) is adhered to a surface contactor with a piece of double sided tape. The coefficient of dynamic friction is measured at randomly selected 12 points at a measuring load of 50 g/cm$^2$, a measuring speed of 1.7 mm/s, and a measuring distance of 20 mm, and the average value thereof is determined as the coefficient of dynamic friction.

<<Average Thickness>>

In order to prevent fogging in a high-temperature and high-humidity (e.g., 35° C. and 85% RH) atmosphere for a certain period or longer (e.g., 10 minutes or longer), it is effective to adjust a thickness of the functional layer to a certain thickness or thicker.

From the above-mentioned point of view, an average thickness of the functional layer is preferably 10 μm or more, more preferably 20 μm or more, and particularly preferably 30 μm or more.

When the average thickness of the functional layer is thick, a height of the projected portion of the edge portion becomes high by the thickness of the functional layer. Therefore, the average thickness is preferably less than 45 μm and more preferably 40 μm or less.

The average thickness can be determined by the following method.

A thickness of the functional layer can be measured by observing a cross-section of the laminate under a field emission scanning electron microscope S-4700 (product name, available from Hitachi High-Technologies Corporation). The thickness is measured at randomly selected 10 points. An average value of the measured values is determined as an average thickness. In this case, the measurement is performed at points excluding the edge portion of the laminate.

<<Active Energy Ray Curable Resin Composition>>

For example, the functional layer is a cured product of an active energy ray curable resin composition.

The active energy ray curable resin composition preferably includes a hydrophobic monomer having a hydrophobic molecular structure and a surfactant. The active energy ray curable resin may further include other monomers, a polymerization initiator, a solvent, etc., according to the necessity.

<<<Hydrophobic Monomer>>>

The hydrophobic monomer has a hydrophobic molecular structure. In the present invention, examples of the hydrophobic molecular structure include a structure including fluorine or silicon. Examples of the hydrophobic molecular structure include a fluoroalkyl structure, a perfluoropolyether structure, and a dimethylsiloxane structure.

The hydrophobic monomer is preferably (meth)acrylate including a perfluoropolyether group and is preferably a compound including, as a perfluoropolyether group, a repeating structure of —(O—$CF_2CF_2$)—, —(O—$CF_2CF_2CF_2$)—, or —(O—$CF_2C(CF_3)F$)—. Examples of commercial products of the hydrophobic monomer include DAC-HP available from DAIKIN INDUSTRIES, LTD., FLUOROLINK AD1700 available from Solvay Specialty Polymers Japan K.K., FLUOROLINK MD700 available from Solvay Specialty Polymers Japan K.K., CN4000 available from Sartomer, and KY-1203 available from Shin-Etsu Chemical Co., Ltd.

When the hydrophobic monomer has a perfluoropolyether group (perfluoropolyether structure), in addition to that the functional layer has low surface energy, dirt on a resultant functional layer is easily wiped because a molecular chain thereof is flexible and easily moved. From the view points as mentioned, the hydrophobic monomer preferably has a perfluoropolyether group (perfluoropolyether structure).

For example, moreover, the hydrophobic monomer is (meth)acrylate. Namely, the hydrophobic monomer is, for example, (meth)acrylate having a hydrophobic molecular structure.

An amount of the hydrophobic monomer in the active energy ray curable resin composition is not particularly limited and may be appropriately selected depending on the intended purpose. The amount of the hydrophobic monomer is preferably from 0.001% by mass to 10% by mass, more preferably from 0.001% by mass to 5.0% by mass, and particularly preferably from 0.01% by mass to 5.0% by mass, relative to a total amount of monomers in the active energy ray curable resin composition.

<<<Surfactant>>>

The surfactant is not particularly limited and may be appropriately selected depending on the intended purpose. For example, the details and preferable embodiments of the surfactant are identical to the details and preferable embodiments of the surfactant as a component of the active energy ray curable resin composition in the description of the primer layer.

Since the active energy ray curable resin composition for forming the functional layer includes the surfactant as well as the active energy ray curable resin composition for forming the primer layer including the surfactant, a height of a projected portion on an edge portion of the functional layer formed on the primer layer, a width of the projected portion, and a length between the edge side and the apex can be made even smaller.

An amount of the surfactant in the active energy ray curable resin composition is not particularly limited and may be appropriately selected depending on the intended purpose. The amount of the surfactant is preferably from 0.0001% by mass to 5.0% by mass, more preferably from 0.0001% by mass to 3.0% by mass, and particularly preferably from 0.005% by mass to 1.0% by mass, relative to a non-volatile component of the active energy ray curable resin composition.

<<<Other Monomers>>>

Examples of the above-mentioned other monomers include a hydrophilic monomer and a crosslinking agent.

—Hydrophilic Monomer—

For example, the hydrophilic monomer has an alkylene oxide equivalent of less than 100 and an acryl equivalent of from 200 to 500.

The alkylene oxide equivalent is a monomer mass per mole of an alkylene oxide group and is obtained by dividing a molecular weight of the monomer with the number of alkylene oxide groups per mole of the monomer.

The acryl equivalent is a monomer mass per mole of a (meth)acryl group and is obtained by dividing a molecular weight of a monomer with the number of (meth)acryl groups [also referred to as (meth)acryloyl groups] per molecule of the monomer.

The number of carbon atoms of an alkylene group in the alkylene oxide is preferably from 1 to 12, and more preferably from 1 to 4.

Examples of the alkylene oxide include methylene oxide (the number of carbon atoms: 1), 1,2-ethyleneoxide (the number of carbon atoms: 2), 1,3-propyleneoxide (the number of carbon atoms: 3), 1,2-propyleneoxide (the number of carbon atoms: 3), and 1,4-butyleneoxide (the number of carbon atoms: 4).

The lower limit of the alkylene oxide equivalent of the hydrophilic monomer is not particularly limited and may be appropriately selected depending on the intended purpose. The alkylene oxide equivalent is, for example, 30 or greater, 40 or greater, etc.

The hydrophilic monomer includes a (meth)acryloyl group. The number of the (meth)acryloyl groups in the hydrophilic monomer is not particularly limited and may be appropriately selected depending on the intended purpose. The number is preferably from 2 to 6 and more preferably from 2 to 4.

The term "(meth)acryloyl group" means an acryloyl group or a methacryloyl group.

The hydrophilic monomer is not particularly limited and may be appropriately selected depending on the intended purpose, as long as the hydrophilic monomer has an alkylene oxide equivalent of less than 100 and an acryl equivalent of from 200 to 500. Examples of the hydrophilic monomer include alkoxylated trimethylol propane tri(meth)acrylate, alkoxylated glycerin tri(meth)acrylate, alkoxylated pentaerythritol tetra(meth)acrylate, and polyalkylene glycol di(meth)acrylate. Examples of the alkoxylated trimethylol propane tri(meth)acrylate include ethoxylated trimethylol propane tri(meth)acrylate.

A molecular weight of the hydrophilic monomer is not particularly limited and may be appropriately selected depending on the intended purpose. The molecular weight thereof is preferably from 300 to 2,500, more preferably from 400 to 2,000, and particularly preferably from 600 to 1,500.

An amount of the hydrophilic monomer in the active energy ray curable resin composition is not particularly limited and may be appropriately selected depending on the intended purpose. The amount of the hydrophilic monomer is preferably from 55% by mass to 90% by mass and more preferably from 60% by mass to 75% by mass relative to a non-volatile component of the active energy ray curable resin composition. When the amount falls within the above-mentioned preferable range, the functional layer is unlikely to fog, to be scratched, and to be affected by chemicals.

purpose. The amount of the crosslinking agent is preferably from 5% by mass to 40% by mass, more preferably from 20% by mass to 35% by mass, and particularly preferably from 20% by mass to 30% by mass relative to a non-volatile component of the active energy ray curable resin composition. When the amount thereof is less than 5% by mass, scratch resistance and chemical resistance are impaired. When the amount thereof is greater than 40% by mass, an anti-fogging property may be degraded.

Examples of the hydrophilic monomer and the crosslinking agent and alkylene oxide equivalents thereof and acryl equivalents thereof are listed below.

TABLE 1

|  | Monomer | Molecular weight | The number of AO groups per molecule | The number of acryl groups per molecule | AO equivalent | Acryl equivalent |
| --- | --- | --- | --- | --- | --- | --- |
| Hydrophilic monomer | SR9035 | 956 | 15 | 3 | 63.7 | 318.7 |
|  | ATM-35E | 1892 | 35 | 4 | 54.1 | 473 |
|  | A-GLY-20E | 1295 | 20 | 3 | 64.8 | 431.7 |
|  | A-600 | 708 | 14 | 2 | 50.6 | 354.0 |
|  | A-GLY-9E | 811 | 9 | 3 | 90.1 | 270.3 |
|  | A-400 | 508 | 9 | 2 | 56.4 | 254.0 |
| Crosslinking agent | EBECRYL40 | 571 | 4 | 4 | 142.8 | 142.8 |
|  | PU610 | 1800 | 0 | 6 | — | 300.0 |
|  | ABE-300 | 466 | 3 | 2 | 155.3 | 233.0 |

—Crosslinking Agent—

The crosslinking agent is different from the hydrophilic monomer. For example, the crosslinking agent has an alkylene oxide equivalent of 100 or more. For example, the crosslinking agent moreover has an acryl equivalent of less than 400.

In the present invention, a crosslinking agent that does not have alkylene oxide is also included in the crosslinking agent.

For example, the crosslinking agent is a non-alicyclic crosslinking agent. Namely, the crosslinking agent does not have an alicyclic structure. The alicyclic structure is a ring structure composed of 3 or more carbon atoms.

Examples of the alkylene oxide include ethylene oxide and 1,2-propyleneoxide.

The lower limit of the acryl equivalent of the crosslinking agent is not particularly limited and may be appropriately selected depending on the intended purpose. Examples of the acryl equivalent include 100 or more.

The crosslinking agent includes a (meth)acryloyl group. The number of the (meth)acryloyl groups in the crosslinking agent is not particularly limited and may be appropriately selected depending on the intended purpose. The number thereof is preferably from 2 to 6.

The crosslinking agent is not particularly limited and may be appropriately selected depending on the intended purpose, as long as an alkylene oxide equivalent thereof is 100 or more and an acryl equivalent thereof is less than 400. Examples of the crosslinking agent include pentaerythritol alkoxytetra(meth)acrylate, aliphatic urethane (urethane) acrylate, and ethoxylated bisphenol A diacrylate.

A molecular weight of the crosslinking agent is not particularly limited and may be appropriately selected depending on the intended purpose. The molecular weight thereof is preferably from 300 to 2,500, more preferably from 400 to 2,000, and particularly preferably from 500 to 1,900.

An amount of the crosslinking agent in the active energy ray curable resin composition is not particularly limited and may be appropriately selected depending on the intended In Table 1, "AO" denotes alkylene oxide.

The details of the monomers presented in Table 1 are as follows.

[Hydrophilic Monomers]

SR9035: ethoxylated (15) trimethylol propane triacrylate, available from Sartomer Note that, (15) means that the average number of ethylene oxide groups included per mole is 15.

ATM-35E: ethoxylated pentaerythritol tetraacrylate, available from Shin-Nakamura Chemical Co., Ltd.

A-GLY-20E: ethoxylated glycerin triacrylate, available from Shin-Nakamura Chemical Co., Ltd.

A-600: polyethylene glycol diacrylate, available from Shin-Nakamura Chemical Co., Ltd.

A-GLY-9E: ethoxylated glycerin triacrylate, available from Shin-Nakamura Chemical Co., Ltd.

A-400: polyethylene glycol diacrylate, available from Shin-Nakamura Chemical Co., Ltd.

[Crosslinking Agents]

EBECRYL40: pentaerythritol alkoxy tetraacrylate, available from DAICEL-ALLNEX LTD.

PU610: aliphatic urethane acrylate (the number of acryl groups: 6, molecular weight: 1,800), available from Miwon Specialty Chemical Co., Ltd.

ABE-300: ethoxylated bisphenol A diacrylate, available from Shin-Nakamura Chemical Co., Ltd.

<<<Photopolymerization Initiator>>>

Examples of the photopolymerization initiator include a photoradical polymerization initiator, a photo-acid generating agent, a bisazide compound, hexamethoxymethylmelamine, and tetramethoxy glycoluril.

The photoradical polymerization initiator is not particularly limited and may be appropriately selected depending on the intended purpose. Examples of the photoradical polymerization initiator include the following compounds.

1-hydroxy-cyclohexyl-phenyl-ketone 2-hydroxy-1-{4-[4-(2-hydroxy-2-methyl-propionyl)-benzyl]phenyl}-2-methyl-propan-1-one  2,2-dimethoxy-1,2-diphenylethan-1-one 2-hydroxy-2-methyl-1-phenyl-propan-1-one
1-[4-(2-hydroxyethoxy)-phenyl]-2-hydroxy-2-methyl-1-propan-1-one
mixture of 2-[2-oxo-2-phenylacetoxyethoxy]ethyl oxyphenylacetate and 2-(2-hydroxyethoxy)ethyl oxyphenylacetate
2,4,6-trimethylbenzoyl-diphenyl-phosphine oxide In view of preventing yellowing caused in the appearance of the laminate, the photopolymerization initiator is preferably from free from a nitrogen atom in constituent elements thereof.

In view of preventing yellowing caused in the appearance of the laminate, on the other hand, the photopolymerization initiator has constituent elements composed of only C, H, and O, or constituent elements composed of only C, H, P, and O.

An amount of the photopolymerization initiator in the active energy ray curable resin composition is not particularly limited and may be appropriately selected depending on the intended purpose. The amount of the photopolymerization initiator is preferably from 0.1% by mass to 10% by mass, more preferably from 0.1% by mass to 5% by mass, and particularly preferably from 1% by mass to 5% by mass, relative to a non-volatile component of the active energy ray curable resin composition.

<<<Solvent>>>

The solvent is not particularly limited and may be appropriately selected depending on the intended purpose. Examples of the solvent include organic solvents.

Examples of the organic solvents include aromatic-based solvents, alcohol-based solvents, ester-based solvents, ketone-based solvents, glycol ether-based solvents, glycol ether ester-based solvents, chlorine-based solvents, ether-based solvents, N-methylpyrrolidone, dimethylformamide, dimethylsulfoxide, and dimethylacetamide.

In view of obtaining a functional layer of more excellent appearance, the solvent is preferably a solvent having a boiling point of 80° C. or higher.

Examples of the solvent having a boiling point of 80° C. or higher include 1-propanol, 2-propanol, 1-butanol, 2-butanol, 2-methyl-2-propanol, 1,3-butanediol, 1,4-butanediol, 2-ethyl-1-hexanol, n-propyl acetate, isopropyl acetate, butyl acetate, methyl isobutyl ketone, cyclohexanone, diisobutyl ketone, diacetone alcohol, propylene glycol monomethyl ether, methyl cellosolve, ethyl cellosolve, butyl cellosolve, 1,4-dioxane, methyl carbitol, ethyl carbitol, butyl carbitol, ethyl carbitol acetate, and butyl carbitol acetate.

An amount of the solvent in the active energy ray curable resin composition is not particularly limited and may be appropriately selected depending on the intended purpose.

The active energy ray curable resin composition is cured by radiation of active energy rays. The active energy rays are not particularly limited and may be appropriately selected depending on the intended purpose. Examples of the active energy rays include electron beams, UV rays, infrared rays, laser beams, visible rays, ionizing radiation (X rays, α rays, β rays, γ rays, etc.), microwaves, and high-frequency waves.

One example of the laminate will be described.

Figure 2:
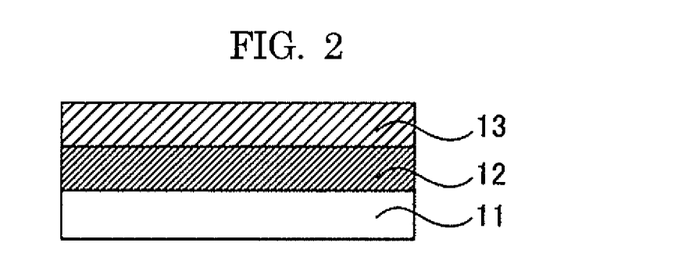
FIG. 2 is a schematic cross-sectional view illustrating one example of the laminate of the present invention.

FIG. 2 is a schematic cross-sectional view illustrating one example of the laminate of the present invention.

The laminate of FIG. 2 includes a substrate 11, a primer layer 12, and a functional layer 13.

(Active Energy Ray Curable Resin Composition)

The active energy ray curable resin composition of the present invention includes a surfactant, and may further include other components, such as urethane (meth)acrylate, a photopolymerization initiator, and a solvent, according to the necessity.

The active energy ray curable resin composition is used in formation of the primer layer of the laminate of the present invention.

The details and preferable embodiments of the components of the active energy ray curable resin composition are identical to the details and preferable embodiments of the components of the active energy ray curable resin composition in the description of the primer layer.

(Method for Manufacturing Laminate)

The method for manufacturing a laminate of the present invention includes at least a primer layer-forming step, preferably further includes a functional layer-forming step, and may further include other steps according to the necessity.

The method for manufacturing the laminate is a preferable manufacturing method of the laminate of the present invention.

<Primer Layer-Forming Step>

Examples of the primer layer-forming step include a step including applying an active energy ray curable resin composition for forming a primer layer on the substrate and curing the active energy ray curable resin composition to form the primer layer.

The details and preferable embodiments of the components of the active energy ray curable resin composition for forming a primer layer are identical to the details and preferable embodiments of the components of the active energy ray curable resin composition in the description of the primer layer of the laminate.

<Functional Layer-Forming Step>

Examples of the functional layer-forming step include a step including irradiating the active energy ray curable resin composition for forming a functional layer disposed on the primer layer with ultraviolet rays in an atmosphere having an oxygen concentration of less than 1% by volume to form the functional layer.

The details and preferable embodiments of the active energy ray curable resin composition for forming a functional layer are identical to the details and preferable embodiments of the active energy ray curable resin composition in the description of the functional layer of the laminate.

Excellent curability is obtained by performing ultraviolet ray irradiation in an atmosphere having an oxygen concentration of less than 1% by volume when the functional layer is formed. As a result, a functional layer having a low coefficient of dynamic friction and a high contact angle can be obtained.

Examples of the atmosphere having an oxygen concentration of less than 1% by volume include an inert gas atmosphere, such as a nitrogen atmosphere.

(Product)

The product of the present invention includes the laminate of the present invention on a surface thereof. The product may further include other members according to the necessity.

The product is not particularly limited and may be appropriately selected depending on the intended purpose. Examples of the product include window materials (e.g., glass windows, refrigerating/freezing display cases, and windows for automobiles), mirrors for bathrooms, mirrors (e.g., wing mirrors of automobiles), floors and walls of bathrooms, surfaces of solar battery panels, or security surveillance cameras. The product is preferable a mirror, and particularly preferably a mirror for bathrooms or for washstands.

An example of a mirror that is the product of the present invention will be described with reference to FIG. 3.

Figure 3:
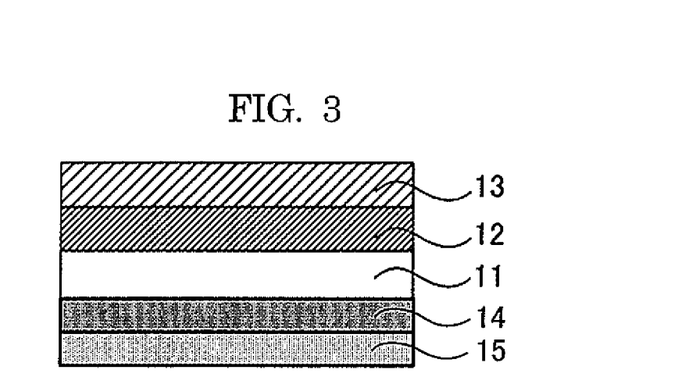
FIG. 3 is a schematic cross-sectional view illustrating one example of a product of the present invention.

The product of FIG. 3 includes a substrate 11, a primer layer 12, and a functional layer 13 disposed in this order. The product further includes, on an opposite side of the substrate 11 to the side where the primer layer 12 is disposed, a metal layer 14 and a back protective layer 15 disposed in this order.

For example, the substrate 11 is soda lime silica glass produced by a float method etc., and on a back surface of the substrate 11, a metal layer 14 is formed by a silver mirror reaction, a catalyzer-accelerator method, a sensitizer-activator method, or a vacuum vapor deposition method. A combination of the substrate 11 and the metal layer 14 may not be the above-mentioned combination. For example, the combination may be a glass mirror where multiple layers of a dielectric material are formed by a vacuum vapor deposition method or a sol gel method, a plastic mirror of polycarbonate, polyethylene terephthalate, etc., or a metal mirror of stainless steel, bronze, etc.

The back protective layer 15 is disposed to be next to the metal layer 14 for the purpose of preventing corrosion or deterioration of the metal layer 14. As the back protective layer 15, one layer thereof may be disposed, or two or more layers thereof may be disposed. A material of the back protective layer 15 is not particularly limited and may be appropriately selected depending on the intended purpose. Examples of the material thereof include metals (e.g., copper) and resins (e.g., an epoxy resin, an unsaturated polyester resin, a fluororesin, an acrylic resin, an urethane resin, a melamine resin, and a silicone resin).

In the case where the product is a mirror, an image of a wire mesh is preferably not distorted when the wire mesh having an opening size of 1 cm is placed at a position that is 1 m away from a surface of the mirror in the normal direction relative to the surface of the mirror, and the image of the wire mesh appeared in the mirror is visually evaluated.

The laminate may be formed on part of a surface of the product, or on an entire surface of the product.

EXAMPLES

Examples of the present invention will be explained hereinafter, but Examples shall not be construed as to limit a scope of the present invention in any way.
<Average Thickness>
An average thickness of the functional layer and an average thickness of the primer layer were measured by observing a cross-section of the laminate under field emission scanning electron microscope S-4700 (product name, available from Hitachi High-Technologies Corporation). The thickness was measured at 5 points outside the edge portion and an average value of the measured values was determined as an average thickness.
<Cross-Section Profile of Surface at Edge Portion>
A cross-section profile of a surface of the edge portion of the laminate was measured by means of Stylus Surface Profilometer P-15 available from KLA-Tencor under the following measuring conditions.
[Measuring Conditions]
X scan size=10 mm to 100 mm
Scan Speed=200 μm/sec
Sampling Rate=200 Hz
Multi-Scan Average=1
Applied Force=2.00 mg
Stylus Radius=2.00 μm
<Visibility>
A wire mesh having an opening size of 1 cm was placed at a position that was 50 cm or 1 m away from a surface of the mirror in the normal direction, and an image of the wire mesh appeared in the mirror was visually evaluated based on the following evaluation criteria.
[Evaluation Criteria]
Very good: Any distortion of the image was not noticeable at the edge of the mirror when the wire mesh having an opening size of 1 cm was placed at a position that was 50 cm away from the surface of the mirror in the normal direction relative to the surface of the mirror and the image of the wire mesh appeared in the mirror was visually observed.
Good: Distortion of the image was observed at the edge of the mirror, when the wire mesh having an opening size of 1 cm was placed at a position that was 50 cm away from the surface of the mirror in the normal direction relative to the surface of the mirror and the image of the wire mesh appeared in the mirror was visually observed. However, any distortion of the image was not noticeable at the edge of the mirror, when the wire mesh having an opening size of 1 cm was placed at a position that was 1 m away from the surface of the mirror in the normal direction relative to the surface of the mirror and the image of the wire mesh appeared in the mirror was visually observed.
Poor: The image was distorted at the edge of the mirror and the distortion adversely affected the entire image, when the wire mesh having an opening size of 1 cm was placed at a position that was 1 m away from the surface of the mirror in the normal direction relative to the surface of the mirror and the image of the wire mesh appeared in the mirror was visually observed.
<Pure Water Contact Angle>
A pure water contact angle was measured using a contact angle meter, PCA-1 (available from Kyowa Interface Science Co., Ltd.) under the following conditions. Distilled water was placed in a plastic syringe. TO the tip of the syringe, stainless steel needle was attached. The distilled water was allowed to drip on an evaluation surface (surface of the functional layer).
Amount of water to be dripped: 2 μL
Measurement temperature: 25° C.
The contact angle 5 seconds after dripping of water was measured at randomly selected 10 points on the surface of the functional layer, and the average value thereof was determined as the pure water contact angle.
<Hexadecane Contact Angle>
A hexadecane contact angle was measured using a contact angle meter, PCA-1 (available from Kyowa Interface Science Co., Ltd.) under the following conditions. Hexadecane was placed in a plastic syringe. To the tip of the syringe, a stainless steel needle was attached. The hexadecane was allowed to drip on an evaluation surface (surface of the functional layer).
Amount of hexadecane to be dripped: 1 μL
Measurement temperature: 25° C.
The contact angle 20 seconds after dripping of hexadecane was measured at randomly selected 10 points on the surface of the functional layer, and the average value thereof was determined as the hexadecane contact angle.
<Coefficient of Dynamic Friction>
A coefficient of dynamic friction was measured using Triboster TS501 (product name, available from Kyowa Interface Science Co., Ltd.). BEMCOT (registered trademark) M-3II (product name, available from Asahi Kasei Corporation) was adhered to a surface contactor with a piece of double sided tape. The coefficient of dynamic friction was measured at randomly selected 12 points at a measuring load of 50 g/cm$^2$, a measuring rate of 1.7 mm/s, and a measuring distance of 20 mm, and the average value thereof was determined as the coefficient of dynamic friction.

<Anti-Fogging Property>

A test piece was left to stand in a normal temperature environment for 2 hours, followed by exposing to an environment of 35° C. and 85% RH. A surface of the test piece was visually observed and an anti-fogging property was evaluated based on the following criteria.

[Evaluation Criteria]
Very good: The area having poor visibility due to fogging and droplets was 30% or less 15 minutes after the test.
Good: The area having poor visibility due to fogging and droplets was 30% or less up to 10 minutes after the test.
Fair: The area having poor visibility due to fogging and droplets was 30% or less up to 5 minutes after the test.
Poor: The area having poor visibility due to fogging and droplets was more than 30% within 5 minutes.

<Anti-Fogging Property after Heating>

Figure 4A:
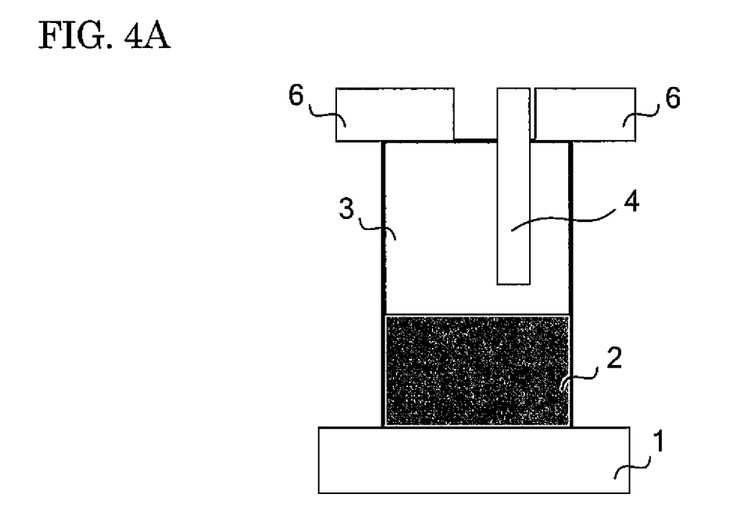
FIG. 4A is a schematic view explaining a method of an anti-fogging test using vapor.
Figure 4B:
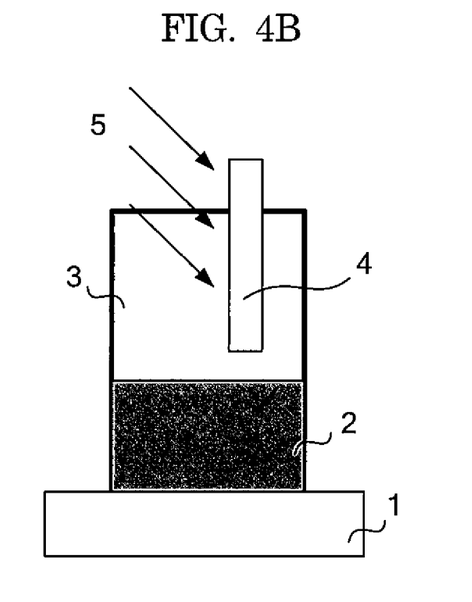
FIG. 4B is a schematic view explaining the method of an anti-fogging test using vapor.

A container was filled up to about a half the depth thereof with water. The water was heated by a heater (1) and the temperature of the water (2) was maintained at 55° C., and the temperature of the air (3) in the upper space inside the container was maintained at 35° C. The laminate (sample (4)) was arranged in the container in a manner that the laminate was not to be in contact with water (warm water (2)) (FIG. 4A). Then, warm water (5) of about 40° C. was splashed over the functional layer of the laminate (sample (4)) (FIG. 4B). Thereafter, the sample was returned to the state of FIG. 4A, and 10 minutes later, cloudiness of the laminate was visually observed. The result was evaluated based on the following evaluation criteria. Note that, in FIG. 4A, "6" is a lid.

[Evaluation Criteria]
Very good: No change was observed at all in the appearance of the surface of the functional layer.
Good: A change in the appearance, such as white fogging and formation of a water film, was confirmed on a part of the surface of the functional layer.
Poor: The appearance of the surface of the functional layer was changed entirely, such as white fogging, and formation of a water film.

<Anti-Fouling Property>

A surface of the functional layer was stained with Sharpie PROFESSIONAL (product name, black oil-based ink pen, available from Newell Rubbermaid). Thereafter, the stain was wiped with a piece of tissue paper (Elleair, available from DAIO PAPER CORPORATION) 10 times in circle motions. The surface was visually observed and evaluated based on the following criteria.

[Evaluation Criteria]
Good: The surface repelled the ink very well and the stain was removed after wiping 2 to 5 times.
Fair: The surface repelled the ink weakly and the stain was removed after wiping 6 to 10 times.
Poor: The surface did not repel the ink and the stain was remained even after wiping 10 times.

<Scratch Resistance>

A melamine sponge (product name: Gekiochi-kun) was wet with tap water and then was placed on a surface of the functional layer. After sliding the sponge back and forth 10,000 times (sliding stroke: 3 cm, sliding speed: 6 cm/s) at a load of 300 gf/cm$^2$, scratch resistance was evaluated based on the following evaluation criteria.

[Evaluation Criteria]
Good: There was no change in the appearance, such as scratches and white clouding.
Poor: There was a change in the appearance, such as scratches and white clouding.

<Chemical Resistance>

A piece of cloth wet with acetone was placed on a surface of the functional layer for 10 minutes. Thereafter, chemical resistance was evaluated based on the following evaluation criteria.

[Evaluation Criteria]
Good: There was no change in the appearance.
Poor: There was a change in the appearance, such as surface burn and white clouding.

<Coat Adhesion>

After exposing to the following environment, a cross-cut adhesion test was performed on each sample according to JIS K5600-5-6 (the cross-cut test method) and coat adhesion was evaluated based on the following criteria.

[Exposure Environments]
1. Exposed to vapor generated from hot water of 80° C. for 5 minutes.
2. Immersed in Kabikiller (available from JOHNSON COMPANY, LIMITED) for 1 hour.

[Evaluation Criteria]
Good: No peeling occurred under the both conditions.
Poor: Peeling occurred under one of or both conditions.

<Pencil Hardness>

Pencil hardness was measured according to JIS K 5600-5-4.

Example 1

<Substrate>

A mirror (a mirror in which a film of silver was formed on float plate glass, average thickness: 5 mm) was used as a substrate.

<Formation of Primer Layer>

The following resin composition for forming a primer layer was applied onto the mirror serving as the substrate in a manner that an average thickness after drying and curing was to be 2 µm. After the application, the resin composition was dried for 3 minutes in an oven of 80° C. Ultraviolet ray irradiation was performed using a high-pressure mercury lamp in an air atmosphere at a radiation dose of 500 mJ/cm$^2$, to thereby obtain a primer layer.

—Resin Composition for Forming Primer Layer—
UT5181 (available from Nippon Synthetic Chemical Industry Co., Ltd.): 65.0 parts by mass
EBECRYL 40 (available from DAICEL-ALLNEX LTD.): 35.0 parts by mass
UV3500 (available from BYK): 0.05 parts by mass
IRGACURE 184D (available from BASF): 3.0 parts by mass
Solvent PGME (propylene glycol monomethyl ether): 900 parts by mass The details of the materials are as follows.
UT5181: urethane acrylate
IRGACURE 184D: 1-hydroxy-cyclohexyl-phenyl-ketone
EBECRYL 40: pentaerythritol alkoxy tetraacrylate
UV3500: silicone-based surfactant <Formation of Functional Layer>

Next, an active energy ray curable resin composition having the following composition was applied onto the primer layer in a manner that an average thickness after drying and curing was to be 35 µm. After the application, the resin composition was dried for 2 minutes in an oven of 80° C. Ultraviolet ray irradiation was performed using a metal halide lamp in a nitrogen atmosphere at a radiation dose of 500 mJ/cm$^2$ to cure an anti-fogging and anti-fouling coating layer (functional layer), to thereby obtain an anti-fogging and anti-fouling laminate.

—Active Energy Ray Curable Resin Composition [Resin Composition for Forming Anti-Fogging and Anti-Fouling Coating Layer (Functional Layer)]—
  SR9035 (available from Sartomer): 67.9 parts by mass
  EBECRYL 40 (available from DAICEL-ALLNEX LTD.): 29.1 parts by mass
  OPTOOL DAC-HP (available from DAIKIN INDUSTRIES, LTD.): 0.1 parts by mass
  IRGACURE 184D (available from BASF): 2.9 parts by mass
  PGME (propylene glycol monomethyl ether): 100 parts by mass The details of the materials are as follows.
SR9035: ethoxylated (15) trimethylol propane triacrylate
OPTOOL DAC-HP: UV curable perfluoropolyether (PFPE)

The above-described evaluations were performed on the obtained anti-fogging and anti-fouling laminate. The results are presented in Table 3-1.

Example 2

An anti-fogging and anti-fouling laminate was obtained in the same manner as in Example 1, except that an anti-fogging and anti-fouling coating layer (functional layer) was formed using an active energy ray curable resin composition having the following composition.
—Active Energy Ray Curable Resin Composition [Resin Composition for Forming Anti-Fogging and Anti-Fouling Coating Layer (Functional Layer)]—
  SR9035 (available from Sartomer): 67.9 parts by mass
  EBECRYL 40 (available from DAICEL-ALLNEX LTD.): 29.1 parts by mass
  OPTOOL DAC-HP (available from DAIKIN INDUSTRIES, LTD.): 0.1 parts by mass
  UV3500 (available from BYK): 0.05 parts by mass
  IRGACURE 184D (available from BASF): 2.9 parts by mass
  PGME (propylene glycol monomethyl ether): 100 parts by mass The obtained anti-fogging and anti-fouling laminate was evaluated in the same manner as in Example 1. The results are presented in Table 3-1.

Comparative Example 1

An anti-fogging and anti-fouling laminate was obtained in the same manner as in Example 1, except that a primer layer was formed using an active energy ray curable resin composition having the following composition and the average thickness of the anti-fogging and anti-fouling coating layer (functional layer) was changed to 45 μm.
—Active Energy Ray Curable Resin Composition (Resin Composition for Forming Primer Layer)—
  UT5181 (available from Nippon Synthetic Chemical Industry Co., Ltd.): 65.0 parts by mass
  EBECRYL 40 (available from DAICEL-ALLNEX LTD.): 35.0 parts by mass
  IRGACURE 184D (available from BASF): 3.0 parts by mass
  Solvent PGME (propylene glycol monomethyl ether): 900 parts by mass The obtained anti-fogging and anti-fouling laminate was evaluated in the same manner as in Example 1. The results are presented in Table 3-1.

Comparative Example 2

An anti-fogging and anti-fouling laminate was obtained in the same manner as in Example 1, except that the average thickness of the anti-fogging and anti-fouling coating layer was changed to 45 μm.

The obtained anti-fogging and anti-fouling laminate was evaluated in the same manner as in Example 1. The results are presented in Table 3-1.

Comparative Example 3

A commercially available anti-fogging mirror for washstands was evaluated. The results are presented in Table 3-1.

Example 3

An anti-fogging and anti-fouling laminate was obtained in the same manner as in Example 1, except that the primer layer was formed using an active energy ray curable resin composition having the following composition.
—Active Energy Ray Curable Resin Composition (Resin Composition for Forming Primer Layer)—
  UT5181 (available from Nippon Synthetic Chemical Industry Co., Ltd.): 65.0 parts by mass
  EBECRYL 40 (available from DAICEL-ALLNEX LTD.): 35.0 parts by mass
  UV3500 (available from BYK): 0.01 parts by mass
  IRGACURE 184D (available from BASF): 3.0 parts by mass
  Solvent PGME (propylene glycol monomethyl ether): 900 parts by mass The obtained anti-fogging and anti-fouling laminate was evaluated in the same manner as in Example 1. The results are presented in Table 3-1.

Example 4

An anti-fogging and anti-fouling laminate was obtained in the same manner as in Example 1, except that the primer layer was formed using an active energy ray curable resin composition having the following composition.
—Active Energy Ray Curable Resin Composition (Resin Composition for Forming Primer Layer)—
  UT5181 (available from Nippon Synthetic Chemical Industry Co., Ltd.): 65.0 parts by mass
  EBECRYL 40 (available from DAICEL-ALLNEX LTD.): 35.0 parts by mass
  UV3500 (available from BYK): 1.0 part by mass
  IRGACURE 184D (available from BASF): 3.0 parts by mass
  Solvent PGME (propylene glycol monomethyl ether): 900 parts by mass The obtained anti-fogging and anti-fouling laminate was evaluated in the same manner as in Example 1. The results are presented in Table 3-1.

Examples 5 to 9

Each anti-fogging and anti-fouling laminate was obtained in the same manner as in Example 1, except that the resin composition for forming a primer layer, the resin composition for forming a functional layer, the average thickness of the primer layer, and the average thickness of the functional layer were changed to the resin composition for forming a primer layer, resin composition for forming a functional layer, average thickness of the primer layer, and average thickness of the functional layer presented in Table 2-2.

The obtained anti-fogging and anti-fouling laminates were evaluated in the same manner as in Example 1. The results are presented in Table 3-2.

The resin compositions for forming a primer layer, resin composition for forming a functional layer, average thicknesses of the primer layers, and average thicknesses of the functional layers in Examples 1 to 4 and Comparative Examples 1 to 3 are summarized in Table 2-1.

TABLE 2-1

|  |  | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| Resin composition for forming primer layer | UT5181 | 65.0 | 65.0 | 65.0 | 65.0 | 65.0 | 65.0 | — |
|  | EBECRYL40 | 35.0 | 35.0 | 35.0 | 35.0 | 35.0 | 35.0 | — |
|  | UV3500 | 0.05 | 0.05 | 0.01 | 1.0 | — | 0.05 | — |
|  | KP323 | — | — | — | — | — | — | — |
|  | UV3510 | — | — | — | — | — | — | — |
|  | IRGACURE 184D | 3.0 | 3.0 | 3.0 | 3.0 | 3.0 | 3.0 | — |
|  | PGME | 900 | 900 | 900 | 900 | 900 | 900 | — |
| Film thickness of primer layer |  | 2 μm | 2 μm | 2 μm | 2 μm | 2 μm | 2 μm | — |
| Resin composition for forming functional layer | SR9035 | 67.9 | 67.9 | 67.9 | 67.9 | 67.9 | 67.9 | — |
|  | A-GLY-20E | — | — | — | — | — | — | — |
|  | EBECRYL40 | 29.1 | 29.1 | 29.1 | 29.1 | 29.1 | 29.1 | — |
|  | DAC-HP | 0.1 | 0.1 | 0.1 | 0.1 | 0.1 | 0.1 | — |
|  | UV3500 | — | 0.05 | — | — | — | — | — |
|  | KY-1203 | — | — | — | — | — | — | — |
|  | IRGACURE 184D | 2.9 | 2.9 | 2.9 | 2.9 | 2.9 | 2.9 | — |
|  | PGME | 100 | 100 | 100 | 100 | 100 | 100 | — |
| Film thickness of functional layer |  | 35 μm | 35 μm | 35 μm | 35 μm | 45 μm | 45 μm | — |

TABLE 2-2

|  |  | Ex. 5 | Ex. 6 | Ex. 7 | Ex. 8 | Ex. 9 |
|---|---|---|---|---|---|---|
| Resin composition for forming primer layer | UT5181 | 65.0 | 65.0 | 65.0 | 65.0 | 65.0 |
|  | EBECRYL40 | 35.0 | 35.0 | 35.0 | 35.0 | 35.0 |
|  | UV3500 | — | — | — | 0.03 | 0.05 |
|  | KP323 | 0.05 | — | 0.05 | — | — |
|  | UV3510 | — | 0.01 | — | — | — |
|  | IRGACURE 184D | 3.0 | 3.0 | 3.0 | 3.0 | 3.0 |
|  | PGME | 900 | 900 | 900 | 900 | 900 |
| Film thickness of primer layer |  | 2 μm | 2 μm | 2 μm | 2 μm | 2 μm |
| Resin composition for forming functional layer | SR9035 | 67.9 | 67.9 | — | — | — |
|  | A-GLY-20E | — | — | 67.9 | 77.6 | 58.2 |
|  | EBECRYL40 | 29.1 | 29.1 | 29.1 | 19.4 | 38.8 |
|  | DAC-HP | 0.1 | 0.1 | — | — | — |
|  | UV3500 | — | — | — | — | — |
|  | KY-1203 | — | — | 0.1 | 0.1 | 0.05 |
|  | IRGACURE 184D | 2.9 | 2.9 | 2.9 | 2.9 | 2.9 |
|  | PGME | 100 | 100 | 100 | 100 | 100 |
| Film thickness of functional layer |  | 35 μm | 35 μm | 35 μm | 30 μm | 40 μm |

A unit for the formulated amount in Tables 2-1 and 2-2 is part(s) by mass.

The details of unexplained materials in Tables 2-1 and 2-2 are as follows.

KP323: silicone-based surfactant, available from Shin-Etsu Chemical Co., Ltd.
UV3510: silicone-based surfactant, available from BYK
KY-1203: hydrophobic monomer, available from Shin-Etsu Chemical Co., Ltd.

TABLE 3-1

|  |  | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| Cross-section profile | (h) (μm) | 6.1 | 5.3 | 6.3 | 5.8 | 6.0 | 7.0 | 13 |
|  | (w) (μm) | 13 | 5.7 | 14 | 12 | 19 | 14 | 2.5 |
|  | (l) (μm) | 4.0 | 2.5 | 4.5 | 3.8 | 4.9 | 6.0 | 1.4 |
| Visibility of image in mirror |  | Good | Very good | Good | Good | Poor | Poor | Poor |
| Pure water contact angle (°) |  | 110 | 108 | 110 | 110 | 110 | 110 | 58 |
| Hexadecane contact angle (°) |  | 67 | 67 | 67 | 67 | 67 | 67 | 10 |
| Coefficient of dynamic friction |  | 0.37 | 0.2 | 0.37 | 0.37 | 0.37 | 0.37 | 0.57 |
| Anti-fogging |  | Very good | Very good | Very good | Very good | Very good | Very good | Poor |
| Anti-fogging after heating |  | Very good | Very good | Very good | Very good | Very good | Very good | Good |
| Anti-fouling property |  | Good | Good | Good | Good | Good | Good | Poor |
| Scratch resistance |  | Good | Good | Good | Good | Good | Good | Poor |
| Chemical resistance |  | Good | Good | Good | Good | Good | Good | Good |
| Coat adhesion |  | Good | Good | Good | Good | Good | Good | Good |
| Pensile hardness |  | 3H | 3H | 3H | 3H | 3H | 3H | H |

TABLE 3-2

| | | Ex. 5 | Ex. 6 | Ex. 7 | Ex. 8 | Ex. 9 |
|---|---|---|---|---|---|---|
| Cross-section profile | (h) (μm) | 6.5 | 6.5 | 6.0 | 6.1 | 6.1 |
| | (w) (μm) | 13 | 14 | 13 | 14 | 13 |
| | (l) (μm) | 4.0 | 4.5 | 3.9 | 3.9 | 3.7 |
| Visibility of image in mirror | | Good | Good | Good | Good | Good |
| Pure water contact angle (°) | | 110 | 110 | 113 | 113 | 113 |
| Hexadecane contact angle (°) | | 67 | 67 | 68 | 68 | 67 |
| Coefficient of dynamic friction | | 0.37 | 0.37 | 0.33 | 0.32 | 0.33 |
| Anti-fogging | | Very good | Very good | Very good | Very good | Very good |
| Anti-fogging after heating | | Very good | Very good | Very good | Very good | Very good |
| Anti-fouling property | | Good | Good | Good | Good | Good |
| Scratch resistance | | Good | Good | Good | Good | Good |
| Chemical resistance | | Good | Good | Good | Good | Good |
| Coat adhesion | | Good | Good | Good | Good | Good |
| Pensile hardness | | 3H | 3H | 3H | 3H | 3H |

In Examples 1 to 9, distortion of the image at the edge of the mirror was minor compared to Comparative Examples. Among Examples, distortion of the image at the edge of the mirror was not particularly noticed in Example 2 because the height (h) of the projected portion was 5.5 mm or less, the width (w) of the projected portion was 6.0 mm or less, and the length (l) between the edge side and the apex was 3.0 mm or less.

On the other hand, in Comparative Examples 1 to 3, the distortion of the image at the edge was noticeable.

INDUSTRIAL APPLICABILITY

The laminate of the present invention can be used for window materials (e.g., glass windows, refrigerating/freezing display cases, and windows for automobiles), mirrors used near water (e.g., bathroom mirrors and washstand mirrors), mirrors (e.g., wing mirrors of automobiles), floors and walls of bathrooms, surfaces of solar battery panels, or security surveillance cameras. The laminate of the present invention can be more preferably used for a mirror for bathrooms and washstands.

The present application claims priority to Japanese Patent Application No. 2017-182186, filed on Sep. 22, 2017 and incorporated herein by reference.

What is claimed is:

1. A laminate comprising:
   a substrate;
   a primer layer disposed on the substrate; and
   a functional layer disposed on the primer layer, where the functional layer has a function of at least one of an anti-fogging property or an anti-fouling property,
   wherein a surface of an edge portion of the laminate at the side of the functional layer has a projected portion having an apex formed along an edge side of the edge portion,
   on a cross-section orthogonal to a direction of the edge side and a planar direction of the surface, a height of the projected portion is 10 μm or less, a width of the projected portion is 15 mm or less, and a length between the edge side and the apex is 5.0 mm or less,
   wherein the primer layer is a cured product of an active energy-ray curable resin composition, and
   the active energy ray curable resin composition includes a surfactant.

2. The laminate according to claim 1,
   wherein a height of the projected portion is from 1 μm to 10 μm.

3. The laminate according to claim 1,
   wherein a surface of the functional layer has a pure water contact angle of 80° or more and a hexadecane contact angle of 35° or more.

4. The laminate according to claim 1,
   wherein the primer layer has an average thickness of from 0.5 μm to 5 μm.

5. The laminate according to claim 1,
   wherein the functional layer has an average thickness of 10 μm or more.

6. The laminate according to claim 1,
   wherein the functional layer has a coefficient of dynamic friction of 0.40 or less.

7. The laminate according to claim 1,
   wherein the surfactant is at least one of a silicone-based surfactant and a fluorine-based surfactant.

8. The laminate according to claim 1,
   wherein an amount of the surfactant in the active energy ray curable resin composition is from 0.0001% by mass to 5.0% by mass relative to a non-volatile component of the active energy ray curable resin composition.

9. A product comprising:
   the laminate according to claim 1 on a surface of the product.

10. The product according to claim 9,
    wherein the product is a mirror.

11. The product according to claim 10,
    wherein the product is at least one of a mirror for bathrooms, and a mirror for washstands.

12. The product according to claim 10,
    wherein an image of a wire mesh appeared in the mirror is not distorted when the wire mesh having an opening size of 1 cm is placed at a position that is 1 m away from a surface of the mirror in the normal direction relative to the surface of the mirror and the image of the wire mesh appeared in the mirror is visually evaluated.

13. An active energy ray curable resin composition comprising:
    a surfactant,
    wherein the active energy ray curable resin composition is used for forming the primer layer of the laminate according to claim 1.

14. The active energy ray curable resin composition according to claim 13,
    wherein the surfactant is at least one of a silicone-based surfactant and a fluorine-based surfactant.

15. The active energy ray curable resin composition according to claim 13,
    wherein an amount of the surfactant in the active energy ray curable resin composition is from 0.0001% by mass to 5.0% by mass relative to a non-volatile component of the active energy ray curable resin composition.

16. A method for manufacturing the laminate according to claim 1, the method comprising:
    applying an active energy ray curable resin composition including a surfactant onto the substrate and curing the active energy ray curable resin composition to form the primer layer.

17. The method according to claim 16,
    wherein the surfactant is at least one of a silicone-based surfactant and a fluorine-based surfactant.

18. The method according to claim 16,
    wherein an amount of the surfactant in the active energy ray curable resin composition is from 0.0001% by mass to 5.0% by mass relative to a non-volatile component of the active energy ray curable resin composition.

* * * * *